(12) United States Patent
Al-Tabakha (10) Patent No.: US 9,862,365 B2
(45) Date of Patent: Jan. 9, 2018

(54) SYSTEMS AND METHODS FOR REDUCING DISTURBANCES CAUSED BY USING GAIN SCHEDULING IN ELECTRONIC BRAKE ACTUATOR CONTROLS

(71) Applicant: GOODRICH CORPORATION, Charlotte, NC (US)

(72) Inventor: Emad Al-Tabakha, Dayton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 170 days.

(21) Appl. No.: 15/004,639

(22) Filed: Jan. 22, 2016

(65) Prior Publication Data
US 2017/0210362 A1 Jul. 27, 2017

(51) Int. Cl.
*B60T 8/17* (2006.01)
*B64C 25/44* (2006.01)
*B60T 13/74* (2006.01)
*B64C 25/42* (2006.01)

(52) U.S. Cl.
CPC .......... *B60T 8/1703* (2013.01); *B60T 13/746* (2013.01); *B64C 25/44* (2013.01); *B64C 25/426* (2013.01)

(58) Field of Classification Search
CPC ........ B60T 13/74; B60T 13/746; B60T 18/32; B60T 18/3205; B60T 18/321; B60T 18/325; B60T 18/00; B60T 18/1703; B64C 25/426; B64C 25/44
See application file for complete search history.

(56) References Cited

U.S. PATENT DOCUMENTS

| 3,614,173 | A | * | 10/1971 | Branson | B60T 8/1703 188/181 C |
| 4,336,592 | A | * | 6/1982 | Beck | B60T 8/1703 303/112 |
| 5,762,407 | A | * | 6/1998 | Stacey | B60T 7/042 303/113.4 |
| 8,489,302 | B2 | * | 7/2013 | Cahill | B60T 8/00 701/34.4 |
| 2002/0103596 | A1 | | 8/2002 | Zhu et al. | |
| 2003/0120413 | A1 | * | 6/2003 | Park | B60T 8/1703 701/71 |
| 2003/0220731 | A1 | * | 11/2003 | Zierolf | B60T 8/1703 701/71 |
| 2004/0232762 | A1 | * | 11/2004 | Maron | B60T 13/74 303/20 |

(Continued)

FOREIGN PATENT DOCUMENTS

GB 2469891 11/2010
WO 03011668 2/2003

OTHER PUBLICATIONS

Extended European Search Report dated Jun. 16, 2017 in European Application No. 17152599.1.

*Primary Examiner* — Thomas G Black
*Assistant Examiner* — Sara J Lewandroski
(74) *Attorney, Agent, or Firm* — Snell & Wilmer, L.L.P.

(57) ABSTRACT

Systems and methods for reducing disturbances that may result from using gain scheduling in brake controls. This method may include the steps of detecting a control signal, comparing the control signal to a threshold value, and gradually increasing or decreasing a controller gain in response to amplitude of the control signal being above or below the threshold value.

17 Claims, 6 Drawing Sheets

(56) References Cited

U.S. PATENT DOCUMENTS

| | | | | |
|---|---|---|---|---|
| 2008/0001471 A1* | 1/2008 | Rudd | B60T 8/1703 | |
| | | | 303/3 | |
| 2008/0221768 A1* | 9/2008 | Salamat | B60T 8/1703 | |
| | | | 701/74 | |
| 2010/0185376 A1* | 7/2010 | Onfroy | B60T 8/1703 | |
| | | | 701/70 | |
| 2010/0276988 A1* | 11/2010 | Cahill | B60T 8/1703 | |
| | | | 303/20 | |
| 2014/0118126 A1* | 5/2014 | Garg | G06F 3/016 | |
| | | | 340/407.1 | |
| 2014/0316664 A1* | 10/2014 | Anders | E02F 9/2058 | |
| | | | 701/50 | |
| 2015/0301531 A1* | 10/2015 | Gama-Valdez | B60T 8/1703 | |
| | | | 701/3 | |
| 2016/0114775 A1* | 4/2016 | Ishino | B60T 7/042 | |
| | | | 701/70 | |
| 2016/0159225 A1* | 6/2016 | Nakatsu | B60L 7/26 | |
| | | | 701/71 | |
| 2016/0304068 A1* | 10/2016 | Monzaki | B60T 8/171 | |
| 2016/0355256 A1* | 12/2016 | Gama-Valdez | B60T 8/1703 | |

* cited by examiner

SYSTEMS AND METHODS FOR REDUCING DISTURBANCES CAUSED BY USING GAIN SCHEDULING IN ELECTRONIC BRAKE ACTUATOR CONTROLS

FIELD

The present disclosure relates to aircraft braking systems. In particular, the disclosure relates to reducing disturbances caused by using gain scheduling in electronic brake actuator controllers.

BACKGROUND

Aircraft brake systems typically employ a series of friction disks compressed together to stop the aircraft. In such systems, a control algorithm maybe implemented that uses position, current, force, or other control techniques to achieve controlled wheel braking.

Electric brake actuator control algorithms may use position, current, or force feedback to move the actuator to generate the desired braking torque. The quality of the position, current, or force feedback signal may impact smooth and stable operation. In addition, a clean and accurate signal may reduce actuator power consumption under certain operating conditions and reduce EMI generation from phase power switching. Unfortunately, feedback signals in are seldom clean and carry some amount of noise. This noise can come from the switching power electrics and/or from other surrounding environment sources.

However, degraded signal quality may impede brake performance by way of inconsistent actuator behavior. There are many ways to reduce this noise, including hardware filtering, cable shielding, software dead band filter, etc. Some techniques that maybe implemented for reducing the effects of signal noise can introduce disturbances and instability into the system.

SUMMARY

According to various embodiments, a method for reducing the negative effects of using gain scheduling in brake control is provided. The method may include the steps of detecting a control signal, comparing the control signal to a threshold value, and gradually increasing a controller gain in response to the amplitude of the control signal being above the first threshold value.

In various embodiments, the method may also include the steps of detecting a control signal, comparing the control signal to a threshold value, and gradually decreasing the controller gain in response to the amplitude of the control signal being below a second threshold value. The first threshold value may equal the second threshold value. The control signal may comprise a command force, velocity, position, pressure, and/or current signal. The first threshold value may include a predetermined command force, velocity, position, pressure, and/or current value. The control signal may include an error signal, command setpoint, or controller output.

According to various embodiments, a brake control system is provided. The brake control system may include an electric brake controller (EBAC) configured to control an electromechanical brake actuator (EBA). The EBAC may be configured to increase or decrease a gain of an amplifier in response to a braking command. The EBA may be configured to receive an output signal from the EBAC and apply braking force in response to this output.

In various embodiments, the EBAC may be configured to increase the gain of the amplifier in response to the control signal being above a first threshold value. The EBAC may also be configured to decrease the gain of the amplifier in response to the control signal being below a second threshold value. The first threshold value may equal the second threshold value or vary from the second threshold value. The control signal may include a command force, velocity, position, pressure, and/or current signal. The first threshold value may comprise a predetermined command force, velocity, position, pressure, and/or current value. The EBA may be configured to increase or decrease an angular velocity, torque, position in response to an increased or decreased gain.

According to various embodiments, a brake system is provided. The EBAC may include a processor, and a tangible, non-transitory memory configured to communicate with the processor. The tangible, non-transitory memory may have instructions stored thereon that, in response to execution by the processor, cause the brake system to perform operations. The operations may include detecting a control signal, comparing the control signal to a first threshold value, and increasing a gain of an amplifier in response to the amplitude of the control signal being above a first threshold value. An output signal from the amplifier may comprise an electromechanical brake actuator (EBA) input.

In various embodiments, the operations may further include decreasing the gain of the amplifier in response to the amplitude of the control signal being below a second threshold value. The first threshold value may equal the second threshold value. The control signal may comprise a command signal and the first threshold value comprises a predetermined command value. The control signal may also comprise an error signal, command setpoint, or controller output. The operations may also include increasing an angular velocity of the EBA in response to the increasing the gain of the amplifier.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1:
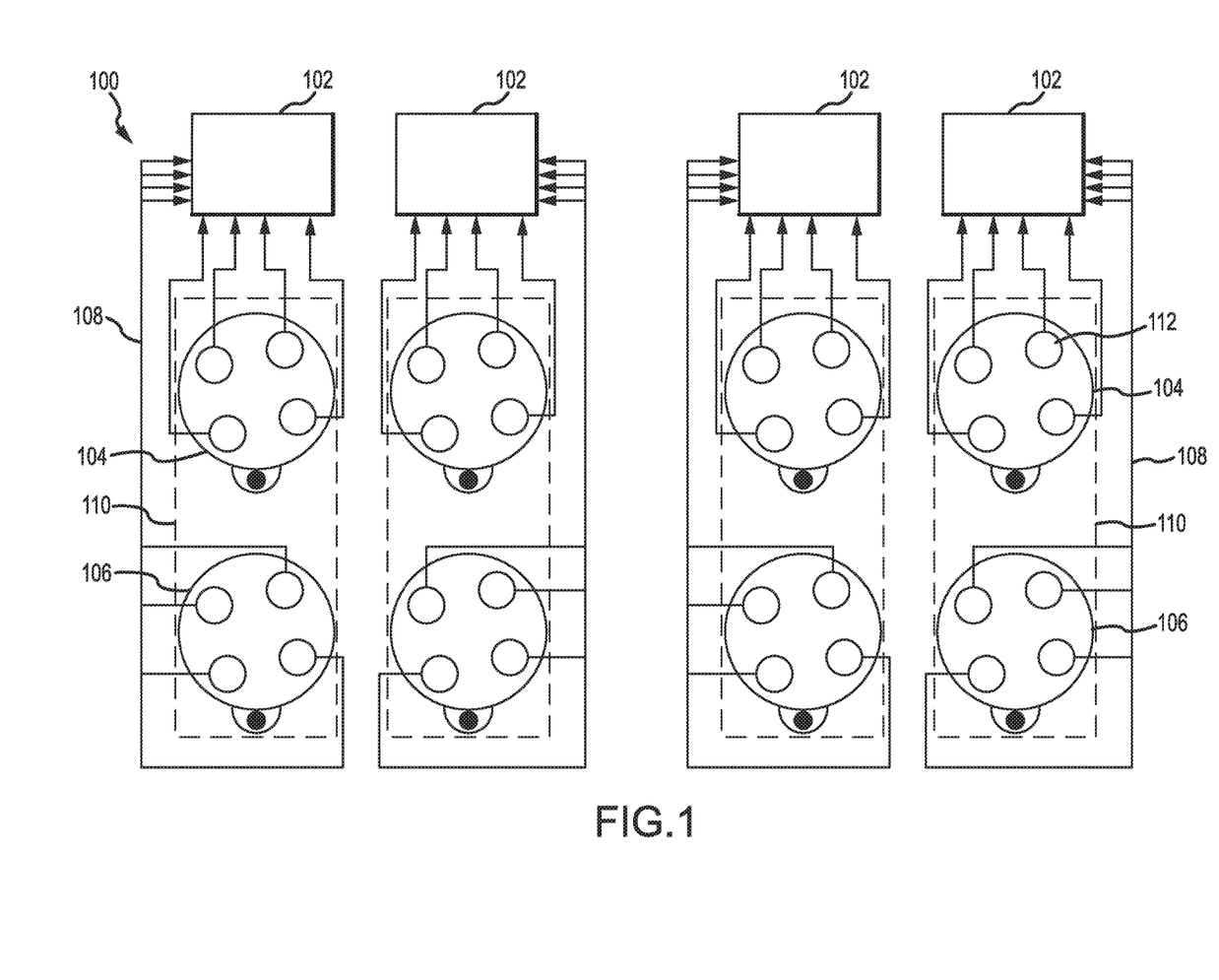
FIG. 1 illustrates an exemplary braking system with multiple brake stacks each having multiple actuators, in accordance with various embodiments.

With reference to FIG. 1, an exemplary brake system 100 is shown, in accordance with various embodiments. Brake system 100 may comprise a plurality of electromechanical brake actuator controllers (EBAC) 102. The EBACs may be electrically coupled to electromechanical actuators (EBA) 112. The EBACs may control EBAs 112 by sending a signal to each EBAs 112 indicative of a force to be applied by EBAs 112. Each brake 104 and brake 106 may include one or more EBAs 112. For example, a brake 104 may have four EBAs 112. Brake 104 may be a forward brake and brake 106 may be an aft brake with brake 104 and brake 106 forming a pair 110 in communication with the EBACs 102 through conduits 108. Conduits 108 may provide two-way communication between EBAs 112 and EBACs 102.

EBAC 102 and/or EBAs 112 may include one or more processors and one or more tangible, non-transitory memories and be capable of implementing logic (as discussed below with reference to FIGS. 4-6). The processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. The processor may thus be configured to implement various logical operations in response to execution of instructions, for example, instructions stored on a non-transitory, tangible, computer-readable medium. As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. §101.

Figure 2:
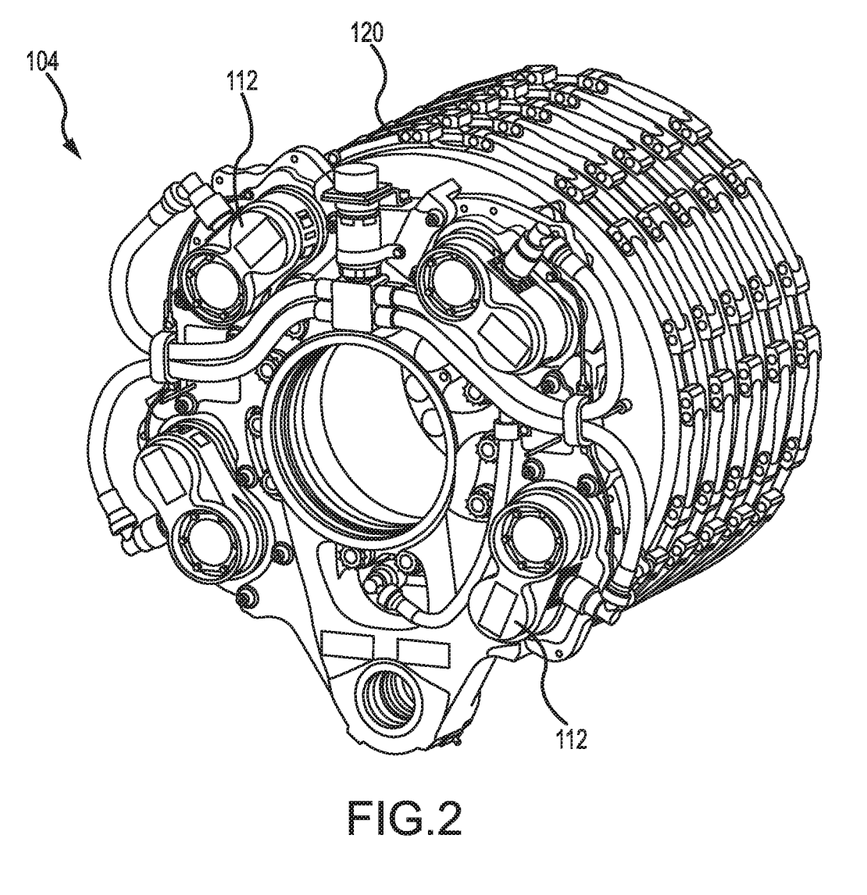
FIG. 2 illustrates an exemplary brake stack having four electromechanical brake actuators, in accordance with various embodiments.

With reference to FIG. 2, a perspective view of brake 104 is shown, in accordance with various embodiments. Brake 104 may comprise a brake stack 120 having a cylindrical geometry. EBAs 112 may be disposed at an end of brake 104. Although brake 104 is illustrated having four EBAs 112, any number of EBAs 112 may be used to apply pressure to brake stack 120. EBAs 112 may each be in electronic communication with one another in order to share load cell information, as discussed in further detail below.

Figure 3:
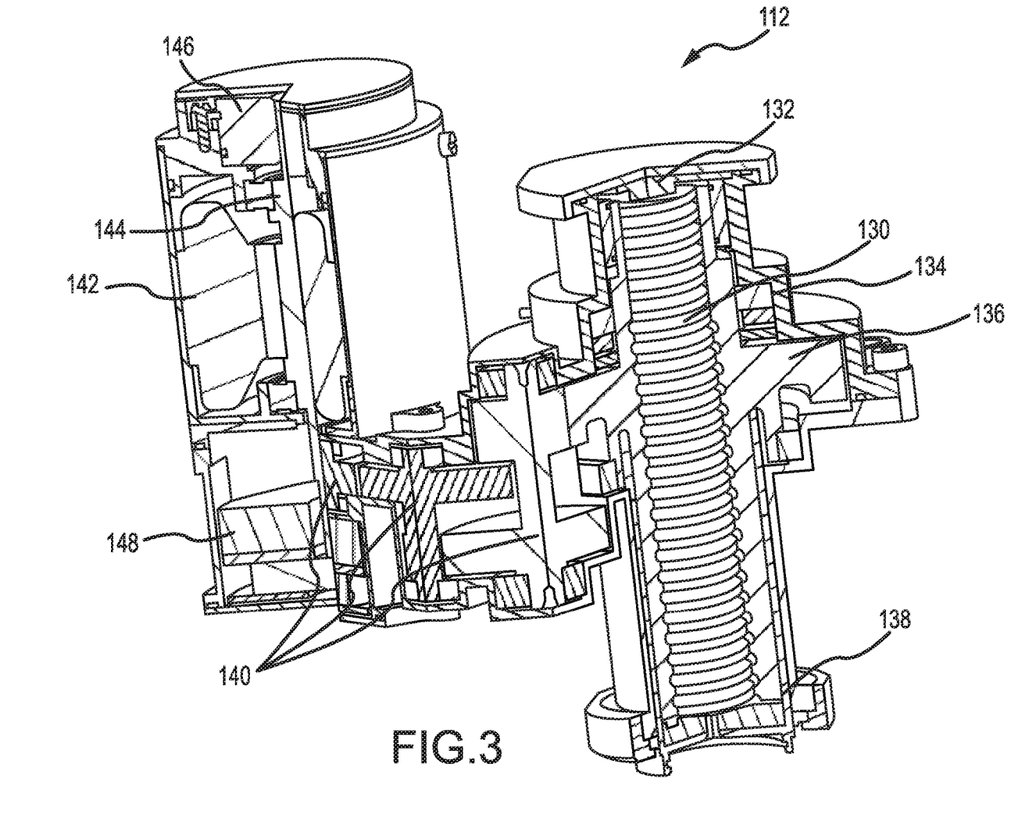
FIG. 3 illustrates a cross sectional view of an exemplary electromechanical brake actuator, in accordance with various embodiments.

With reference to FIG. 3, a cutaway view of an EBA 112 is shown, in accordance with various embodiments. EBA 112 may include a ball screw 130 and a ball nut 136. Ball nut 136 may rotate and urge ball screw 130 into a deployed or retracted position. Ball screw 130 may have a ram disposed at a distal end of ball screw 130 where the ram may be pressed outward from EBA 112 and into brake stack 120 (of FIG. 2). The ram may exert a compressive force on brake stack 120 and thus cause braking. An internal anti-rotation post 132 may stop ball screw 130 from retracting beyond the fully retracted position. A load cell 134 may be disposed in EBA 112. Load cell 134 may produce a voltage change indicative of the force applied by ball screw 130 twisting into a deployed position. Seal 138 may seal EBA 112 at an opposite end of ball nut 136 from internal anti-rotation post 132. Gearing 140 may mechanically couple ball screw 130 and ball nut 136 to rotor assembly 144 of EBA 112. Rotor assembly 144 may rotate relative to stator assembly 142 to convert electrical energy into rotational energy. Position sensor 146 may be a resolver or a plurality of Hall Effect sensors configured to detect a position of EBA 112.

Figure 4:
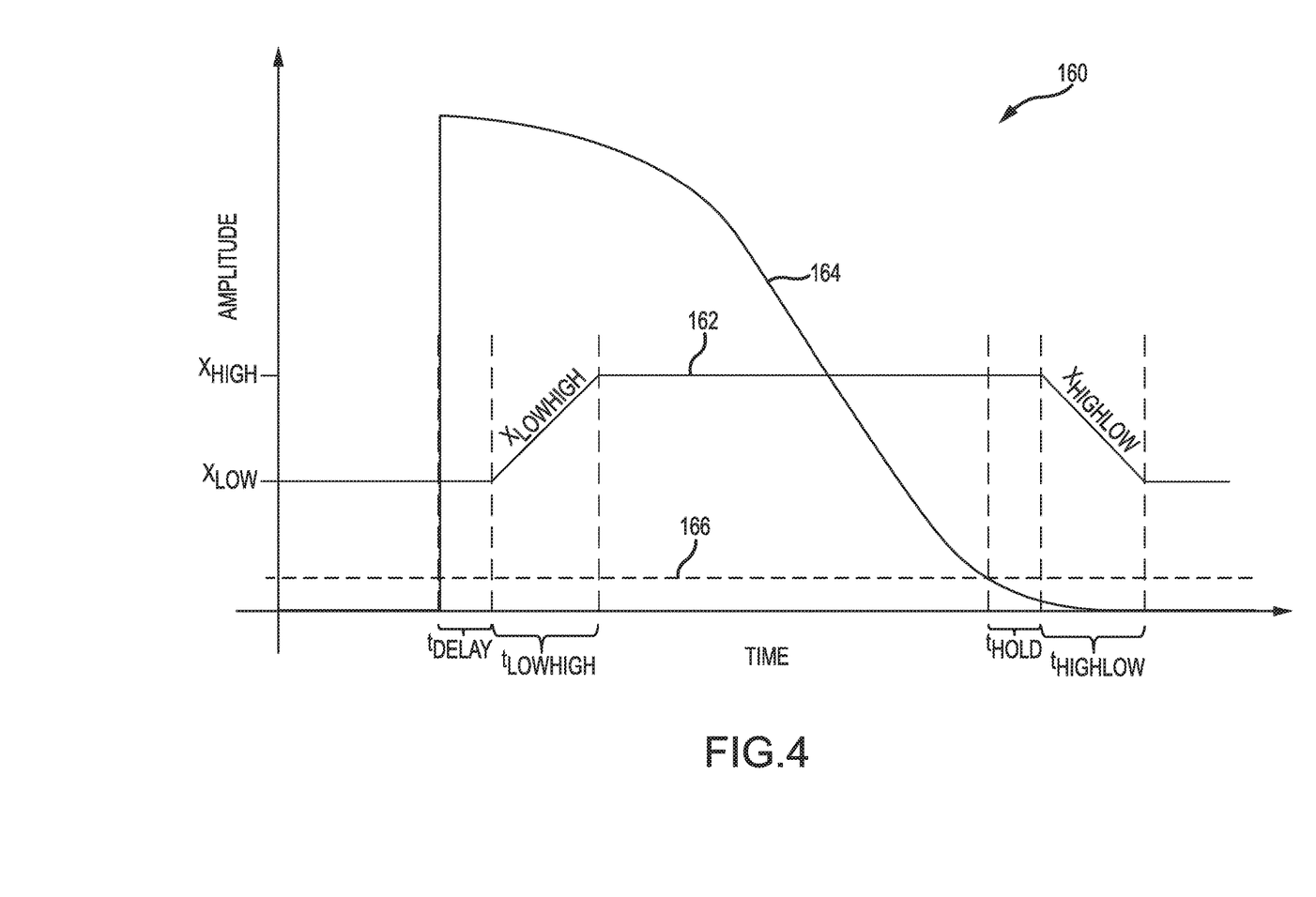
FIG. 4 illustrates an exemplary graph of the amplitude of a control signal and gain settings for controlling an electromechanical brake actuator, in accordance with various embodiments.

With reference to FIG. 4, a graph 160 of a control signal generated by a force controller and gain levels applied to the velocity controller is shown, in accordance with various embodiments. Graph 160 includes plot of the amplitude of control signal 164 generated by the force controller over time. Force controller output may be used as the velocity control setpoint.

Figure 5:
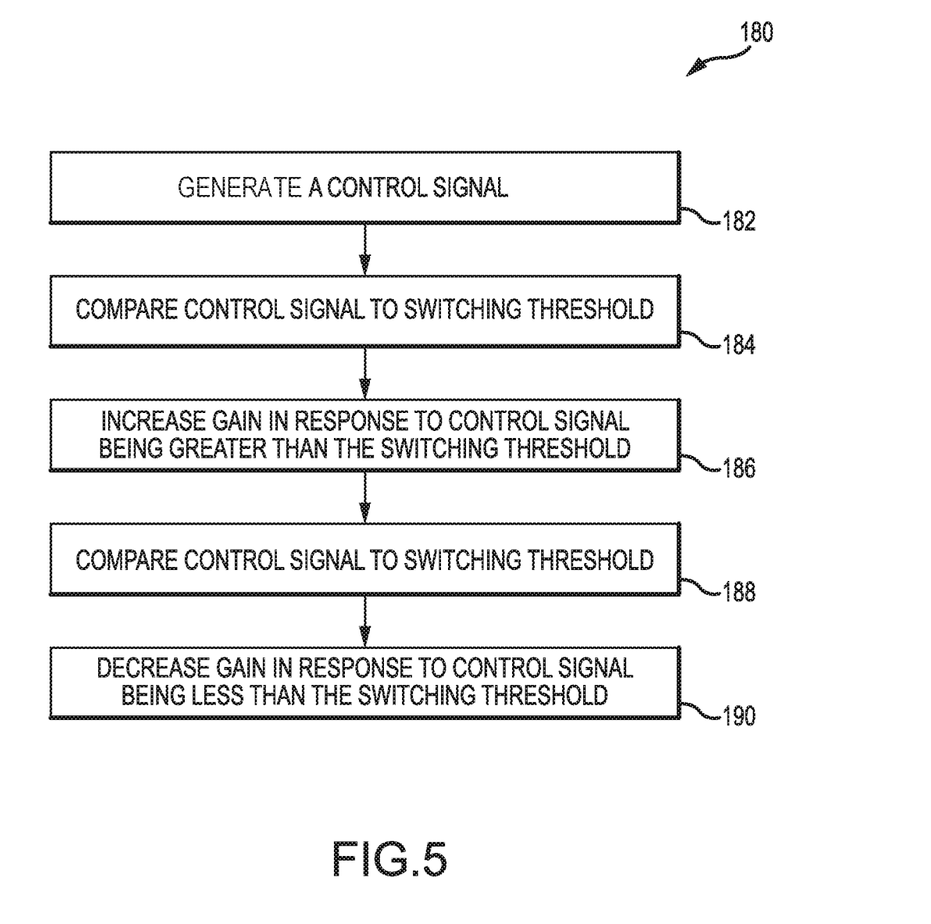
FIG. 5 illustrates an exemplary process for controlling an electromechanical brake actuator using gain scheduling, in accordance with various embodiments.

With reference to FIG. 5, a process 180 for controlling an EBA 112 using brake system 100 is shown, in accordance with various embodiments. EBAC 102 may generate a control signal 164 (Block 182). Control signal 164 may be detected in the form of a command setpoint and EBAC 102 may calculate control signal 164 as the controller output (i.e., the difference between the input command and feedback multiplied by a gain value). Control signal 164 may also be received in the form of a force command.

In various embodiments, EBAC 102 may compare control signal 164 to switching threshold 166 (Block 184). EBAC 102 may increase the gain in response to control signal 164 being above switching threshold 166 (Block 186). EBAC 102 may maintain the increased gain level and continue to compare control signal 164 to switching threshold 166 (Block 188). EBAC 102 may decrease the gain in response to the control signal 164 being less than switching threshold 166 (Block 190). EBAC 102 may use two or more different switching thresholds 166. For example, an increasing threshold may be set to determine when the gain should be increased, and a decreasing threshold may be set to determine when the gain should be decreased. The increasing threshold may differ from the decreasing threshold, or the increasing threshold may be identical to the decreasing threshold. The thresholds may be predetermined values.

Figure 6:
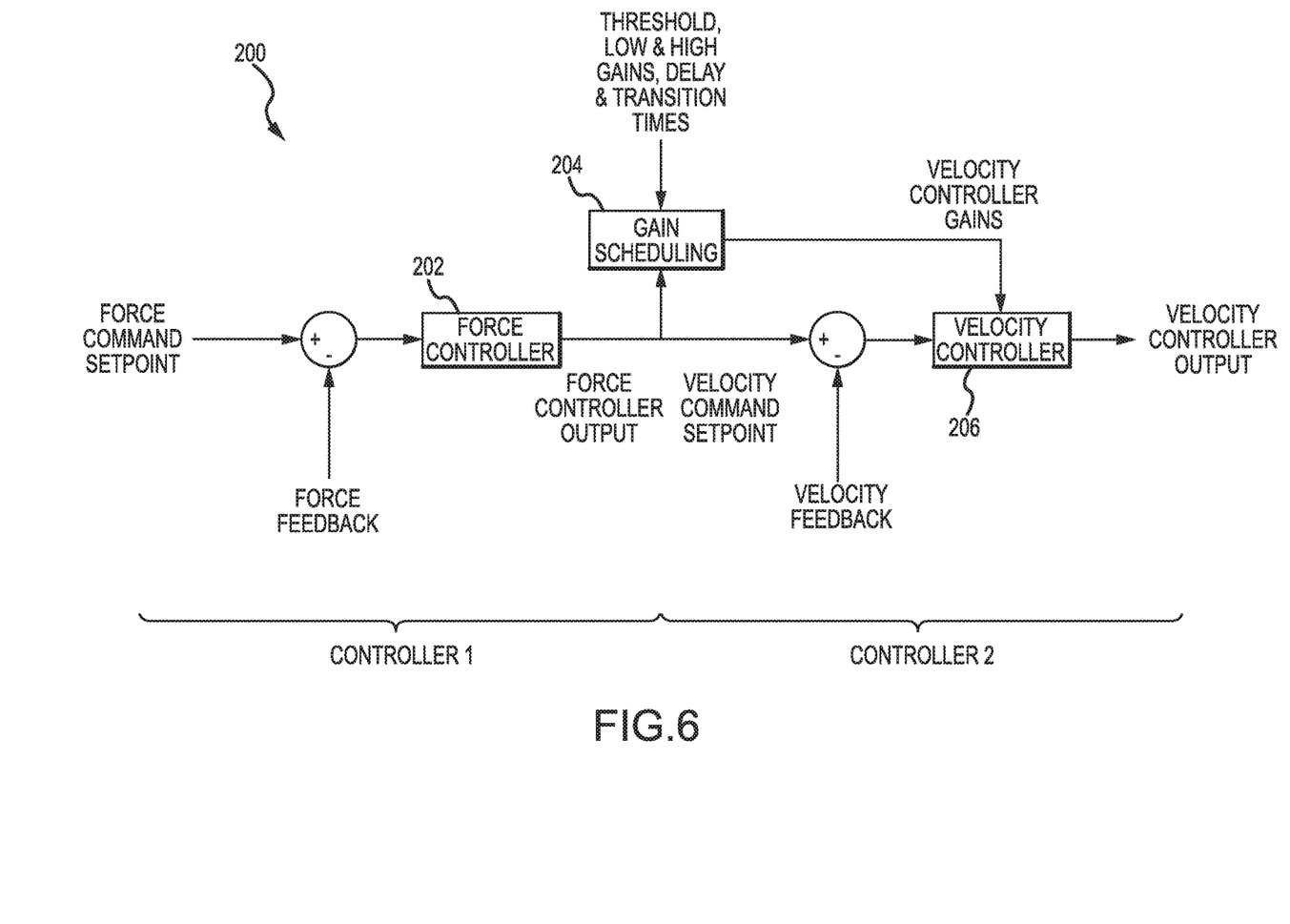
FIG. 6 illustrates an exemplary block diagram for a portion of the control algorithm that may be used in an aircraft brake system, in accordance with various embodiments.

FIG. 6 illustrates an exemplary control system 200 for EBAC 102. Referring now to FIGS. 4 and 6, graph 160 shows the output of controller 1, gain scheduling threshold level, low and high gain values of controller 2, and gain scheduling timing parameters. Controller 1 may have an output 164 equal to the difference between the commanded setpoint and the feedback variable multiplied by controller 1 gains. In various embodiments, force controller 202 of controller 1, produces a velocity command setpoint which is sent to the velocity controller 206 of controller 2. This output 164 (also referred to as the velocity command setpoint) may be calculated by taking the difference between the force command setpoint and the load cell feedback and multiplying the result by the gains of force controller 202. In general, the output of controller 1 is not limited to a velocity command but can include force, current, voltage, pressure, speed or any other signal type.

Gain scheduling threshold 166 of FIG. 4 is the value that output 164 is compared to in determining when to modify gain levels. The threshold 166 may be set as single or multiple values to achieve desired system performance. In various embodiments, threshold 166 may be a single value. In response to the output 164 of the force controller 202 increasing above the threshold, the transition to the high gain may begin. In response to the output 164 of the force controller 202 dropping below the threshold, the transition to the low gain may begin. An example threshold value maybe 800 RPM. In the exemplary case, if the force controller output goes above 800 RPM, transition to $X_{High}$ begins, and if the force controller output goes below 800 RPM, transition to $X_{Low}$ may begin.

Low and high gain values 162 may be the gains used for controller 2 as the output of gain scheduling 204. These gains may be the multipliers used for multiplying the difference of controller 2 setpoint and the feedback to produce an output from the velocity controller 206. There may be multiple sets of high and low gains depending on desired system performance parameters. In an exemplary embodiment, there may be a single set of gains, $X_{Low}$ and $X_{High}$, which are used in controller 2.

In various embodiments, the gain value may be selected based on the (gain scheduling) threshold 166 and the output of controller 1. If the output 164 of the controller 1 is higher than the threshold 166, transition to high gain starts. If the output 164 of the force controller is lower than the threshold value 166 the transition to low gain starts. The transition to high and low gain may include a time delay and may be gradual so as to reduce the effect of any disturbances that may result from immediate gain change in the controller. For example, low and high gain values maybe $X_{Low}=Vp=3000$ and $X_{High}=Vp=7000$.

In various embodiments, controller 1 may be force controller 202 and controller 2 may be velocity controller 206. Force controller 202 output may be the velocity setpoint command for velocity controller 206. In response to this setpoint increasing above the threshold (e.g., 800 RPM), the gains for the velocity controller from gain scheduling 204 start to transition to high gain values (e.g., 7000). In response to the setpoint dropping below the threshold (e.g., 800 RPM), the gains output from gain scheduling 204 for velocity controller 206 start to transition to the low gain values (e.g., 3000).

Gain scheduling timing parameters may include the delay, transition, and hold times. The initial time delay is the delay of the beginning of the high gain transition. The transition time from low to high gain is to gradually transition gain from low to high as to reduce the effects of any disturbances that may result from sudden gain change in the controller. The hold time is to delay the beginning of the low gain transition. The transition time from high to low gain is to gradually transition gain from high to low as to reduce the effects of any disturbances that may result from immediate gain change in the controller. Example Gain scheduling timing parameters may be as follows:

$t_{Delay}=0$, which indicates immediate start of the low to high gain transition.

$t_{LowHigh}=0$, this value indicates that low to high transition is immediate.

$t_{Hold}=20$ ms, which indicates that the high gain value will be applied for an additional 20 ms after the setpoint goes below the threshold.

$t_{HighLow}=200$ ms, which indicates that the high to low gain transition will happen gradually over a 200 ms period. By the end of this period, the gain should be equal to the low gain value.

$t_{LowHigh\ Elapsed\ Transition\ Time}$, this is the elapsed time since start of gain transition from low to high.

$t_{HighLow\ Elapsed\ Transition\ Time}$, this is the elapsed time since start of gain transition from high to low.

Gain transition may be delayed, gradual, or immediate depending on desired system performance. In general, having a gradual gain change reduces the effects of any disturbances that may result from having an immediate gain change in the controller. For example, the formula for calculating the rate of gain change from low to high may be as follows.

$X_{LowHigh}$: The rate of gain change from low to high when feedback error is high. This value may be calculated using the following formula low gain.

$$X_{LowHigh} = X_{Low} + \frac{X_{High} - X_{Low}}{t_{LowHigh}} \times t_{LowHighElapsedTransitionTime}$$

The formula for calculating the rate of gain change from high to low may be as follows.

$X_{HighLow}$: The rate of gain change from high to low when feedback error is low. This value may be calculated using the following formula low gain:

$$X_{HighLow} = X_{High} + \frac{X_{High} - X_{Low}}{t_{HighLow}} \times t_{HighLowElapsedTransitionTime}$$

The gain switching method implemented in the EBAC 102 of FIG. 1 may tend to limit the impact of system disturbances on the performance of EBA 112. Gain may be increased when a setpoint command is above a threshold to drive EBA 112 quickly. Gain may be decreased when a setpoint command is below the threshold to slow down EBA 112.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for controlling brakes, comprising:
   detecting, by a brake system, a control signal;
   comparing, by the brake system, the control signal to a threshold value;
   increasing, by the brake system, a gain of a control algorithm in an electric brake controller (EBAC) in response to an amplitude of the control signal being above the threshold value, wherein an output signal from the EBAC comprises an electromechanical brake actuator (EBA) input; and
   increasing, by the brake system, an angular velocity of the EBA in response to the increasing the gain of the control algorithm.

2. The method of claim 1, wherein the adjusting the gain of the control algorithm comprises decreasing, by the brake system, the gain of the control algorithm in response to the amplitude of the control signal being below the threshold value.

3. The method of claim 1, wherein the adjusting the gain of the control algorithm comprises increasing, by the brake system, the gain of the control algorithm in response to the amplitude of the control signal being above the threshold value.

4. The method of claim 1, wherein the control signal comprises a command velocity setpoint signal.

5. The method of claim 4, wherein the threshold value comprises a predetermined value.

6. The method of claim 1, wherein the control signal comprises an output signal from a controller.

7. A brake control system, comprising:
   an electric brake controller (EBAC) configured to control an electromechanical brake actuator (EBA),
       wherein the EBA is configured to receive an output signal from the EBAC,
       wherein the EBAC is configured to increase a gain of an amplifier in response to a control signal being above a first threshold value, wherein the output signal comprises an output of the amplifier,
       wherein the EBA is configured to increase an angular velocity in response to the increased gain of the amplifier; and
   an aircraft brake configured to apply a force in response to the output signal.

8. The brake control system of claim 7, wherein the control signal comprises an output of a controller in the EBAC.

9. The brake control system of claim 7, wherein the EBAC is configured to decrease the gain of the amplifier in response to the control signal being below a second threshold value.

10. The brake control system of claim 9, wherein the first threshold value equals the second threshold value.

11. The brake control system of claim 7, wherein the control signal comprises a velocity command setpoint signal.

12. The brake control system of claim 11, wherein the first threshold value comprises a predetermined value.

13. An article of manufacture including a non-transitory, tangible computer readable storage medium having instructions stored thereon that, in response to execution by a processor, cause a brake system to perform operations comprising:
    detecting, by the brake system, a control signal;
    comparing, by the brake system, the control signal to a threshold value;
    increasing, by the brake system, a gain of a controller in an electronic brake controller (EBAC) in response to an amplitude of the control signal being above the threshold value, wherein an output signal from the EBAC comprises an electromechanical brake actuator (EBA) input; and
    increasing, by the brake system, an angular velocity of the EBA in response to the increasing the gain of the controller.

14. The article of claim 13, wherein the control signal comprises an error signal.

15. The article of claim 13, wherein the control signal comprises a command force signal and the threshold value comprises a predetermined command force value.

16. The article of claim 13, further comprising decreasing, by the brake system, the gain of the controller in response to the amplitude of the control signal being below a second threshold value.

17. The article of claim 16, wherein the threshold value equals the second threshold value.

\* \* \* \* \*